United States Patent Office 2,970,970
Patented Feb. 7, 1961

2,970,970

COMPOSITION COMPRISING CELLULOSE ESTER AND DIISOCYANATE MODIFIED POLYESTER AMIDE

John H. Prichard, Springfield, N.J., assignor to Celanese Corporation of America, New York, N.Y., a corporation of Delaware No Drawing. Filed July 16, 1958, Ser. No. 748,793

13 Claims. (Cl. 260—16)

This application relates to resinous cellulose derivative compositions, and more particularly concerns plasticized cellulose ester compositions.

Plastic products made from plasticized resinous cellulose derivatives such as cellulose propionate, cellulose acetate, cellulose acetate-butyrate, and the like, have been found to show poor resistance to staining, and particularly, staining due to contact with lipstick and typewriter ribbon ink.

Thus, molded typewriter keys, telephone handsets and the like, prepared from cellulose propionate or cellulose acetate-butyrate are readily stained on contact with lipstick; the resultant stain being irremovable even upon washing with detergents; the stain being especially noticeable on molded keys in the lighter colors.

It has been found that the staining of such molded compositions may be attributed, at least in part, to the plasticizer content of the composition. While the degree of stain may vary with the specific plasticizer and the particular cellulose ester, it is noted that a decrease in the proportion of plasticizer used appears to increase the resistance of the molded product to staining.

However, a reduction in plasticizer content, leads to an increase in moisture absorption and a decrease in toughness and impact strength, as well as a deterioration in other properties of the products molded from cellulose esters having reduced proportions of plasticizer.

Accordingly, an object of this invention is to provide an improved plasticized cellulose ester molding composition which may be converted easily into molded products such as typewriter keys, telephone handsets and the like, which have a high resistance to staining by lipstick or ink from typewriter ribbons, yet having good impact strength and toughness.

Another object of this invention is to provide improved molding compositions wherein the conventional monomeric plasticizers are replaced in whole or in part by a polymeric plasticizer which has the property of increasing the resistance of products molded therefrom to staining by lipstick and the like.

A further object of this invention is to provide an improved molding composition comprising a cellulose ester plasticized with a diisocyanate-modified polyester amide whereby stains on products molded therefrom may be almost entirely removed by wiping with a soft tissue or washing with a detergent.

In accordance with one aspect of the invention, cellulose ester in particulate form, such as cellulose propionate, cellulose acetate or cellulose acetate-butyrate is intimately mixed with a plasticizer in the form of a diisocyanate modified polycarboxylic acid ester amide.

In another aspect of the invention, the plasticizer for the cellulose ester is made up of a major proportion of the diisocyanate-modified polycarboxylic acid ester amide, and a minor proportion of a monomeric plasticizer. When the cellulose ester is the acetate, the preferred monomeric plasticizer is a phosphate ester, such as dimethyl phosphate, diethyl phosphate or dimethoxy ethyl phosphate. When the cellulose is esterified with acids of average chain length in excess of 2.0, the preferred monomeric plasticizer is a carboxylic acid ester having a molecular weight between about 280 and about 420, such as dibutyl sebacate, dioctyl phthalate, butanediol dicaprylate or triethylene glycol dicaprylate.

The diisocyanate modified polyester amide may be formed from the reaction product of a saturated dicarboxylic acid such as adipic, succinic, sebacic, azelaic or the like dibasic acid, and a saturated dihydric alcohol including ethylene glycol, diethylene glycol or propylene glycol, in the presence of an amino compound such as ethanolamine, 3-amino propanol, decamethylenediamine, or 10-aminodecanol; such reaction product being reacted with an aliphatic or cycloaliphatic or aromatic diisocyanate such as hexamethylene diisocyanate, ethylene diisocyanate, trimethylene diisocyanate, m-phenylene diisocyanate, or cyclohexylene diisocyanate.

The polyester amide, prior to diisocyanate modification, preferably has a molecular weight between 500 and 3,000 and instrinsic viscosities in the range of 0.1 to 0.4. It has between about 0.1 and about 0.5 amino linkages for each carboxylic group. A typical polyester amide, for example, would be a condensation polymer of ethylene glycol, adipic acid and monoethanolamine in molar proportions of about 8:10:3.

The reaction of the polyester amide with the diisocyanate effects end-linkage of the primary polymer and increases its molecular weight to above 5,000. Preferably between about 0.05 and about 0.10 mole of diisocyanate are used per mols of dibasic acid residue in the polyesteramide. Examples of the diisocyanate modified polymers which are useful in accordance with this invention and a description of the method of preparing such polymers may be found in British Patent 553,733.

The resinous cellulose derivative is preferably an organic ester of cellulose with one or more carboxylic acids, such as cellulose acetate, cellulose propionate, cellulose butyrate, cellulose acetate-propionate and cellulose acetate-butyrate. Because of their toughness and dimensional stability, esters with aliphatic carboxylic acids having an average chain length in excess of about 2.0 and particularly those having an average chain length between about 2.5 and 3.4, are utilized in applications where they are far more likely to come into contact with staining materials and are the resinous cellulose derivatives most preferred for the purposes of this invention.

In accordance with one aspect of this invention, the resin is preferably in particulate form, such as in the form of powder, grains, flakes or pellets. The plasticizer is in uniform admixture with the resin, so that each pellet, for example, comprises a uniform mixture of resin and plasticizer.

The diisocyanate-modified polyester amide is generally a material of rubbery consistency and the admixture is accomplished on conventional rubber working equipment, such as malaxating rolls.

*Example*

Cellulose propionate was mixed with triethylene glycol dicaprylate in the proportions by weight of 100 parts of the former to 17.5 parts of the latter, the mixture dried at 100–105° C. and compression molded into test discs. Lipstick was applied to the discs which were then aged for 24 hours at 120° F. The discs were cooled to room temperature and the lipstick was wiped off with a soft paper tissue. Considerable stain was noted on the discs.

The discs were then washed with warm water containing a detergent, rinsed with distilled water and dried. The discs still showed considerable stain. Upon making up similar molded discs from cellulose propionate containing no plasticizer or very small amounts of plasticizer of the monomeric type (of the order of 7.5 parts of plasticizer per 100 parts of resin) and subjecting the same to lipstick, as outlined above, staining was considerably reduced. However, the molded samples showed low impact strength, reduced toughness, increased surface hardness and otherwise indicated an insufficient content of plasticizer.

Cellulose propionate amounting to 100 parts by weight was mixed with 5 parts of butanediol dicaprylate and 20 parts of an isocyanate-modified polyester amide made by reacting 5 parts by weight of hexamethylene diisocyanate with 100 parts of the reaction product of adipic acid, ethylene glycol and ethanolamine in the proportion of 1.0:0.9:0.2. Test pieces, injection molded from such a composition had lipstick applied thereto and removed by wiping and washing, as described above. It was found that the lipstick had left a very slight stain.

Molding compositions made from other cellulose esters such as 100 parts of cellulose acetate-butyrate and plasticized with from 15 to 25 parts by weight of diisocyanate modified polyester amide, upon molding by compression or injection, produced molded products showing little stain after being subjected to lipstick or the ink from typewriter ribbons. The polymeric plasticizer could be augmented with up to 7 parts by weight of monomeric plasticizers such as triethylene glycol dicaprylate, butanediol dicaprylate, dibutyl sebacate, dioctyl phthalate, dioctyl adipate, and still produce a molded product having good resistance to staining.

Lipsticks generally contain as colorants, Drug and Cosmetic Dyes Red No. 19, Red No. 21, Red No. 27 and Orange No. 5, singly or in combinations thereof, carried in a vehicle of a waxy or fatty nature, including castor oil, polyethylene glycol, various natural and synthetic waxes, and the like. While the residual stain due to contact of lipstick with molded cellulose esters containing conventional monomeric plasticizers will vary in degree, dependent on the particular colorant and vehicle of the lipstick, it was found that such residual stain was materially reduced when the polymeric plasticizer of the instant invention, alone or in combination with small proportions of monomeric plasticizer was compounded with the cellulose ester to make up the molding compositions of the instant invention.

It is understood that the foregoing detailed description is given by way of illustration and that variations may be made therein without departing from the spirit of my invention.

Having described my invention, what I desire to secure by Letters Patent is:

1. A composition comprising a resinous organic ester of cellulose with at least one lower aliphatic monocarboxylic acid plasticized with from 15 to 25% based on the weight of said cellulose ester of a plasticizer comprising a diisocyanate modified polyester amide, said diisocyanate being selected from the group consisting of hexamethylene diisocyanate, ethylene diisocyanate, trimethylene diisocyanate, m-phenylene diisocyanate and cyclohexylene diisocyanate, and said polyester amide being a reaction product of a saturated dicarboxylic acid selected from the group consisting of adipic, succinic, sebacic and azelaic acids, a saturated dihydric alcohol selected from the group consisting of ethylene glycol, diethylene glycol and propylene glycol, and an amino compound selected from the group consisting of ethanolamine, 3-amino propanol, decamethylene diamine, and 10-aminodecanol.

2. The composition of claim 1 wherein said carboxylic acid has an average chain length of at least 2.0.

3. A composition as in claim 1 wherein 100 parts of ester is plasticized with 15 to 25 parts of said plasticizer.

4. The composition of claim 1 wherein said diisocyanate modified polyester amide is the reaction product of a polyester amide having a molecular weight between 500 and 3000 and having from 0.1 to 0.5 amino linkages for each carboxylic group with from 0.05 to 0.10 mole of diisocyanate per dibasic acid residue in the polyester amide.

5. The composition of claim 2 wherein said carboxylic acid has an average chain length between about 2.5 and about 3.4.

6. A molding composition comprising a resinous lower aliphatic monocarboxylic acid ester of cellulose in particulate form plasticized with from 15 to 25% based on the weight of said cellulose ester of a plasticizer comprising a diisocyanate-modified polyester amide, said diisocyanate being selected from the group consisting of hexamethylene diisocyanate, ethylene diisocyanate, trimethylene diisocyanate, m-phenylene diisocyanate and cyclohexylene diisocyanate, and said polyester amide being a reaction product of a saturated dicarboxylic acid selected from the group consisting of adipic, succinic, sebacic and azelaic acids, a saturated dihydric alcohol selected from the group consisting of ethylene glycol, diethylene glycol and propylene glycol, and an amino compound selected from the group consisting of ethanolamine, 3-amino propanol, decamethylene diamine, and 10-aminodecanol.

7. A molding composition comprising a resinous lower aliphatic monocarboxylic acid ester of cellulose in particulate form plasticized with a plasticizer comprising from 15 to 25% based on the weight of said cellulose ester of a diisocyanate-modified polyester amide and up to 7% based on the weight of said cellulose ester of a carboxylic acid ester having a molecular weight between about 190 and about 420, said diisocyanate being selected from the group consisting of hexamethylene diisocyanate, ethylene diisocyanate, trimethylene diisocyanate, m-phenylene diisocyanate and cyclohexylene diisocyanate, and said polyester amide being a reaction product of a saturated dicarboxylic acid selected from the group consisting of adipic, succinic, sebacic and azelaic acids, a saturated dihydric alcohol selected from the group consisting of ethylene glycol, diethylene glycol and propylene glycol, and an amino compound selected from the group consisting of ethanolamine, 3-amino propanol, decamethylene diamine, and 10-aminodecanol.

8. A molding composition as in claim 7 wherein said polyester amide comprises the hexamethylene diisocyanate-modified reaction product of adipic acid, ethylene glycol and ethanolamine.

9. A molding composition for making molded products resistant to staining by lipstick comprising 100 parts of cellulose propionate, 15 to 25 parts of a diisocyanate-modified polyester amide and up to 7 parts of a carboxylic acid ester selected from the group consisting of butanediol dicaprylate, triethylene glycol dicaprylate, dibutyl sebacate, dioctyl adipate and dioctyl phthalate, said diisocyanate being selected from the group consisting of hexamethylene diisocyanate, ethylene diisocyanate, trimethylene diisocyanate, m-phenylene diisocyanate and cyclohexylene diisocyanate, and said polyester amide being a reaction product of a saturated dicarboxylic acid selected from the group consisting of adipic, succinic, sebacic and azelaic acids, a saturated dihydric alcohol selected from the group consisting of ethylene glycol, diethylene glycol and propylene glycol, and an amino compound selected from the group consisting of ethanolamine, 3-amino propanol, decamethylene diamine, and 10-aminodecanol.

10. A molding composition for making molded products resistant to staining by lipstick comprising 100 parts of cellulose propionate, about 20 parts of a diisocyanate modified polyester amide and about 5 parts of butanediol dicaprylate, said diisocyanate being selected from the group consisting of hexamethylene diisocyanate, ethylene diisocyanate, trimethylene diisocyanate, m-phenylene diisocyanate and cyclohexylene diisocyanate, and said polyester amide being a reaction product of a saturated dicarboxylic acid selected from the group consisting of adipic, succinic, sebacic and azelaic acids, a saturated dihydric alcohol selected from the group consisting of ethylene glycol, diethylene glycol and propylene glycol, and an amino compound selected from the group consisting of ethanolamine, 3-amino propanol, decamethylene diamine, and 10-aminodecanol.

11. A molded article having a composition comprising a resinous cellulose ester of a lower aliphatic monocarboxylic acid plasticized with from 15 to 25% based on the weight of said cellulose ester of a plasticizer comprising a diisocyanate-modified polyester amide, said diisocyanate being selected from the group consisting of hexamethylene diisocyanate, ethylene diisocyante, trimethylene diisocyanate, m-phenylene diisocyanate and cyclohexylene diisocyanate, and said polyester amide being a reaction product of a saturated dicarboxylic acid selected from the group consisting of adipic, succinic, sebacic and azelaic acids, a saturated dihydric alcohol selected from the group consisting of ethylene glycol, diethylene glycol and propylene glycol, and an amino compound selected from the group consisting of ethanolamine, 3-amino propanol, decamethylene diamine, and 10-aminodecanol.

12. A molded typewriter key resistant to staining by lipstick comprising cellulose propionate plasticized with from 15 to 25% based on the weight of said cellulose propionate of a diisocyanate modified polyester amide and up to 7% based on the weight of said cellulose propionate of a monomeric compound selected from the group consisting of butanediol dicaprylate, triethylene glycol dicaprylate, dibutyl sebacate, dioctyl adipate and dioctyl phthalate, said diisocyanate being selected from the group consisting of hexamethylene diisocyanate, ethylene diisocyanate, trimethylene diisocyanate, m-phenylene diisocyanate and cyclohexylene diisocyanate, and said polyester amide being a reaction product of a saturated dicarboxylic acid selected from the group consisting of adipic, succinic, sebacic and azelaic acids, a saturated dihydric alcohol selected from the group consisting of ethylene glycol, diethylene glycol and propylene glycol, and an amino compound selected from the group consisting of ethanolamine, 3-amino propanol, decamethylene diamine, and 10-aminodecanol.

13. A molding composition for making molded products resistant to staining by lipstick comprising a cellulose resinous organic ester of a lower aliphatic monocarboxylic acid in particulate form plasticized with from 15 to 25% based on the weight of said cellulose ester of a diisocyanate-modified polyester amide, said diisocyanate being selected from the group consisting of hexamethylene diisocyanate, ethylene diisocyanate, trimethylene diisocyanate, m-phenylene diisocyanate and cyclohexylene diisocyanate, and said polyester amide being a reaction product of a saturated dicarboxylic acid selected from the group consisting of adipic, succinic, sebacic and azelaic acids, a saturated dihydric alcohol selected from the group consisting of ethylene glycol, diethylene glycol and propylene glycol, and an amino compound selected from the group consisting of ethanolamine, 3-amino propanol, decamethylene diamine, and 10-aminodecanol.

References Cited in the file of this patent

UNITED STATES PATENTS

| | | |
|---|---|---|
| 2,284,896 | Hanford et al. | June 2, 1942 |
| 2,333,639 | Christ et al. | Nov. 9, 1943 |
| 2,333,922 | Foster | Nov. 9, 1943 |
| 2,523,999 | Sattler et al. | Sept. 26, 1950 |